April 14, 1964 T. BUDZICH Re. 25,553

PUMP

Original Filed July 6, 1959 4 Sheets-Sheet 1

INVENTOR.
TADEUSZ BUDZICH

BY
RICHEY, McNENNY & FARRINGTON
Donald W. Farrington
ATTORNEYS

PUMP

Original Filed July 6, 1959 4 Sheets-Sheet 2

INVENTOR.
TADEUSZ BUDZICH
BY
RICHEY, McNENNY & FARRINGTON
Donald W. Farrington
ATTORNEYS

PUMP

Original Filed July 6, 1959 4 Sheets-Sheet 3

INVENTOR.
TADEUSZ BUDZICH
BY
RICHEY, McNENNY & FARRINGTON
Donald W. Farrington
ATTORNEYS April 14, 1964 T. BUDZICH Re. 25,553

PUMP

Original Filed July 6, 1959 4 Sheets-Sheet 4

INVENTOR.
TADEUSZ BUDZICH

BY
RICHEY, MENENNY & FARRINGTON
Donald W. Farrington
ATTORNEYS

United States Patent Office

Re. 25,553
Reissued Apr. 14, 1964

25,553
PUMP

Tadeusz Budzich, Shaker Heights, Ohio, assignor to The Weatherhead Company, Cleveland, Ohio, a corporation of Ohio Original No. 3,087,432, dated Apr. 30, 1963, Ser. No. 825,005, July 6, 1959. Application for reissue Aug. 2, 1963, Ser. No. 300,144
13 Claims. (Cl. 103—37)

Matter enclosed in heavy brackets [ ] appears in the original patent but forms no part of this reissue specification; matter printed in italics indicates the additions made by reissue.

This invention relates to a pump and more particularly to a multicylinder pump having controlled variable volume output characteristics.

According to one feature of my invention, high efficiency is combined with maximum ease and sensitivity of control of the displacement volume by forming each pumping cylinder in an axially slidable cylinder block having an inlet port, the cylinder slidably receiving at one end an axially reciprocating pumping piston and at the other end a reaction piston having an outlet port.

According to another feature of the invention each pumping piston is reciprocated through a fixed stroke by a reaction member, or wobble plate, given to wobbling motion by a rotating swash plate, the reaction member having an axially slidable bearing engagement with the pump housing to maintain the angular relationship between the reaction member and the slidable cylinder block, and reduce the radial forces transferred to the slidable cylinder block.

With this arrangement, the displacement volume of the pump per revolution of the swash plate can be quickly and accurately adjusted by axial sliding of the cylinder block, free of any restraint or possible binding from reaction forces.

According to another feature of my invention the cylinder block is slidably mounted on a central bearing carried by the housing, a plurality of axially extending pumping cylinders are distributed around the central bearing, each slidably receiving at one end a reaction piston supported from the housing, and control means responsive to outlet pressure moves the cylinder block toward or away from the pumping pistons to control the displacement volume per revolution.

In a preferred embodiment of the invention, each reaction piston is surrounded by a compression spring acting between the reaction piston and the cylinder block. The sum of the forces of these springs urges the cylinder block in the direction to increase the displacement, and each reaction piston is pressed by its spring against a cooperating sealing surface carried by the housing. In this embodiment each reaction piston is free to move away from its sealing surface when the pumping piston starts to draw a vacuum in the cylinder, providing an auxiliary inlet opening, thereby increasing the filling rate of the pump cylinder and increasing the volumetric efficiency in the high displacement, high speed range by minimizing cavitation.

In another embodiment of the invention, movement of the cylinder block in the direction to increase the displacement volume is effected by spring means acting between the cylinder block and an end plate carried by the housing, the reaction pistons being carried by the end plate with freedom for radial and circumferential self-adjustment to accommodate necessary manufacturing tolerances, and freedom for slight axial movement away from the cylinder block in response to fluid pressure in the pumping cylinder providing a pressure seal at the ends of the outlet passages in the reaction pistons.

In each of the above embodiments, the outlet passages carried by the housing include check valves which are sealed and supported in the end wall of the housing so that the hydraulic reaction of the fluid in the outlet passages is absorbed by fixed parts of the housing and is not transmitted to the reaction pistons. Thus self-alignment of the reaction pistons with their respective cylinders is not impeded by the fluid pressure developed by the pump and acting against the check valves. In either of the above embodiments the check valve bodies may be arranged to engage directly with and seal against the end surfaces of the reaction pistons, or may engage and be sealed against one side of a fixed end plate carried by the housing, the reaction pistons engaging and sealing against the opposite side of the same plate around passages through the plate.

In each of the above embodiments another feature of the present invention is the formation of a pressure seal between the free end surface of each reaction piston and its associated sealing surface by maintaining the engaging area of these surfaces less than the unbalanced area of the reaction piston subjected to fluid pressure within the cylinder, so that the force per unit area by which the sealing surfaces are pressed together is greater than the pressure per unit area of the fluid being sealed.

According to another feature of this invention the inlet openings into all the cylinders in the sliding cylinder block are formed by a groove turned in the outer surface of the cylinder block intersecting all of the cylinder bores. In one embodiment of this feature the circumferential groove forming the inlet ports is arranged in a plane disposed at an angle other than a right angle to the axis of the cylinder block. With this arrangement, as the cylinder block moves toward the position of minimum displacement, the number of cylinders pumping fluid progressively decreases so that only one of the cylinders, or only a part of the total number of cylinders, is subjected to pumping pressure when the volume of fluid under pressure being used is at a minimum or when no fluid is being used and it is necessary only to replace leakage.

According to another feature of this invention, the cylinder block is formed with external axially extending grooves intersecting the circumferential inlet groove and angularly spaced midway between the angularly spaced cylinder bores, permitting inlet fluid filling the housing to enter the cylinders without throttling, while maintaining adequate wall thickness about each cylinder bore and reducing the diameter of the housing to a minimum.

Other features and advantages of the present invention will appear from the following detailed description of preferred embodiments of the invention. The embodiments illustrated and described also include features of invention providing maximum efficiency and simplicity of the driving arrangement for the wobbling reaction plate which reciprocates the pumping pistons, which features are being claimed in my co-pending application Serial No. 17,832, filed March 28, 1960, and features of invention providing rapid, accurate, and efficient fluid pressure responsive control of the displacement volume, which are being claimed in my co-pending application Serial No. 847,512, filed October 20, 1959.

It is among the objects of my invention to provide a hydraulic pump having a plurality of cylinders angularly spaced about an axis within a pump housing and wherein a rotating drive shaft through an inclined bearing reciprocates pistons mounted in the cylinders and wherein the displacement effected by each piston is varied by moving the cylinders axially and wherein each cylinder is provided with a reaction piston which is axially slidable with respect to the cylinder.

It is a further object of my invention to provide a pump according to the perceding object wherein a pressure responsive assembly moves the cylinders relative to their pistons in response to changes in pressure applied to the pump output.

It is a further object of my invention to provide a pump according to the preceding objects wherein high efficiency is combined with sensitivity of control of the displacement volume by forming each of the cylinders in a cylinder block and wherein each of the cylinders receives a reciprocating pumping piston at one end and a reaction piston is provided with an outlet port.

It is a further object of my invention to provide a pump according to the preceding objects wherein the cylinder block is mounted for axial sliding movement on a central bearing carried by the pump housing and wherein spring means are arranged to bias the cylinder block in one direction tending to increase the displacement and a device responsive to an increase in output pressure is arranged to move the cylinder block in an opposite direction to decrease the displacement.

It is a further object of my invention to provide a pump according to the preceding objects wherein the spring means biasing the cylinder block toward maximum displacement position is effective to urge the reaction pistons away from the cylinder block.

It is a further object of my invention to provide a pump according to the preceding objects having a manual control to limit the maximum volume output.

It is a further object of my invention to provide a pump according to the preceding objects wherein the cylinder block is provided with an annular groove in its outer surface to form inlet openings for each of the cylinders.

It is a further object of my invention to provide a pump according to the preceding object wherein the annular groove is tilted with respect to the central axis of the cylinder block so that as the cylinder block is moved toward a position of minimum displacement the number of cylinders pumping fluid progressively decreases.

Further objects and advantages of my invention will appear from the following description and the appended drawings wherein.

Figure 1:
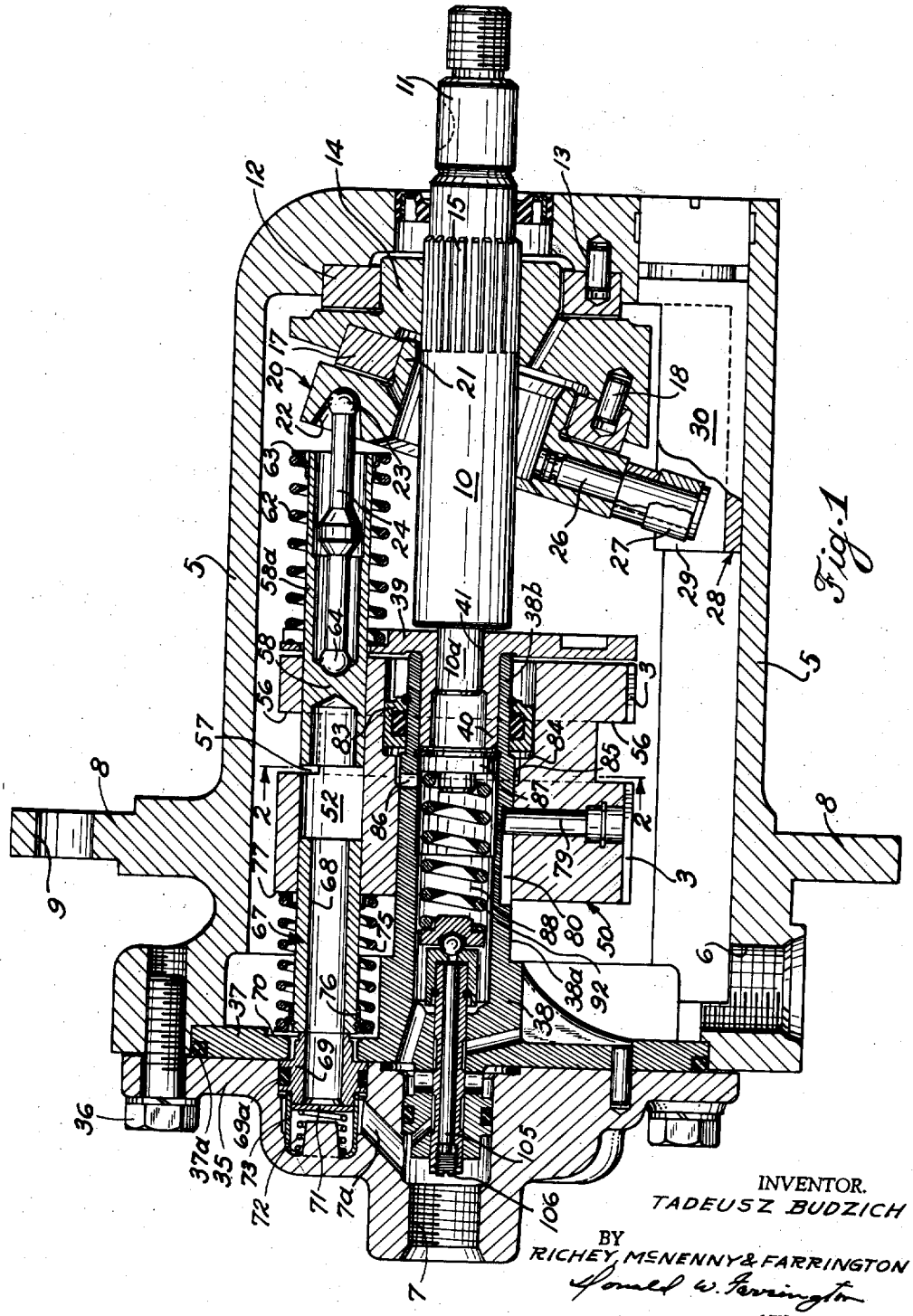
FIG. 1 is an elevation in section of a pump made according to my invention.

Referring to the drawings, a pump housing, indicated in its entirety as at 5, is provided with a low pressure inlet opening as at 6 and a high pressure outlet as at 7. Preferably the exterior of the housing is formed with an annular flange 8 which is apertured as at 9 to receive mounting bolts. A driving shaft 10 projects through the pump housing 5 and the projecting end portion 11 is adapted to receive a pulley or chain sprocket for rotating the shaft 10.

An annular bearing member 12 is carried at the end of the pump housing surrounding the shaft 10 and is fixed against rotation by a dowel pin 13. The cylindrical inner surface of the bearing 12 serves to rotatably mount the inclined bearing drive member 14 and the radial face of the member 12 serves as an axial thrust bearing for the radial face of the member 14. The driving member 14 is splined to the shaft 10 as at 15 and carries in an annular pocket a bearing member 17 which is pinned to driving member 14 as at 18.

A piston rod driver or wobble plate, indicated in its entirety as at 20, includes a sleeve 21 journalled at the inner periphery of the bearing and the member 20 is provided with spaced cups 22 adapted to receive the ball-shaped end 23 of a piston rod 24. The driver 20 includes a radial face bearing against a radial face of the bearing 17 to take axial thrust loads.

Figure 2:
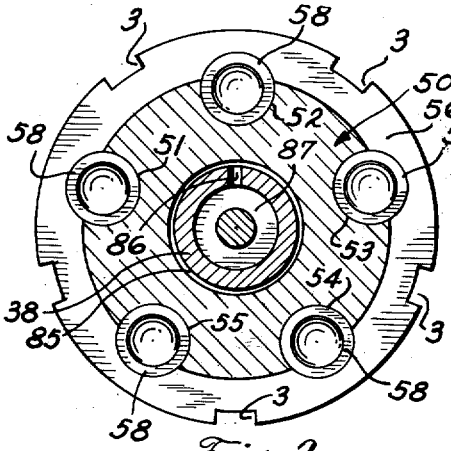
FIG. 2 is a transverse section taken on the plane indicated at 2—2 of FIG. 1.

In the form of pump illustrated in FIGS. 1 and 2 there are five cylinders and in this form of the device the piston rod driver 20 has five spaced pockets such as pocket 22 to drive the piston rods. The piston rod driver 20 is restrained against rotation within the pump housing by means including a pin 26 carried by the driver 20 and projecting therefrom. The lower end of the pin 26 has journalled thereon a bushing 27 which is adapted to ride between the walls of a guide member 28. The walls are indicated at 29 and 30, respectively, and such walls are spaced from each other substantially the diameter of the bushing 27. When the shaft 10 is rotated the inclined member 14, through its bearing 17, progressively tilts the piston rod driver 20 with the result that each of the piston rods 24 are reciprocated through a stroke determined by the inclination of bearing 17 with respect to the axis of the driving shaft 10.

During the operation of the pump the interior of the pump housing is filled with oil by way of the inlet 6 and such quantity of oil at low pressure is available for introduction to the pumping cylinders.

The pump housing 5 is closed at one end by an end cap 35 which is bolted to the housing as at 36 and an end plate 37 is clamped in position in the end of the housing by means of the annular recess on the end face of the housing adjacent the end cap 35. The end plate 37 is provided with an integrally formed tubular guide member 38 which is disposed centrally of the housing 5 and is aligned with the driving shaft 10. A plate 39 having a sleeve portion 40 is mounted within the open end of the tubular guide member 38 and the portions 39—40 are provided with an axial bore as at 41 which serves as a bearing for the innermost end 10a of the drive shaft 10.

A cylinder block, indicated in its entirety as at 50, is provided with a central bore and is mounted for sliding movement on the cylindrical bearing surface 38a of the guide member 38. The cylinder block 50 is provided with five spaced cylinders 51, 52, 53, 54 and 55 as shown in FIG. 2. The cylinder block 50 is provided with an annular loading groove 56 formed in the cylinder block at the exterior thereof so as to provide an inlet port as indicated at 57. The exterior of the cylinder block 50 is preferably grooved axially at 3 to facilitate loading of the fluid into groove 56. One end of the cylinder 52 slidably receives a piston 58. The piston 58 has a tubular skirt 58a and is biased toward the driving plate 20 by means of a spring 62 which surrounds the tubular skirt portion 58a of the piston 58. One end of the spring 62 bears against a flange 63 fixed to the extreme end of the piston skirt 58a. The other end of the spring 62 bears against the plate 39. The end 64 of the piston rod 24 is journalled in a ball-shaped socket formed in the piston 58. The end of the cylinder 52 opposite the piston 58 is provided with a reaction piston 67. The outer diameter of the reaction piston 67 corresponds to the bore of the cylinder and the inner diameter of the reaction piston 67, as at 68, is in alignment with a port sleeve 69 which projects into the pump housing through an opening 70 in the end plate 37. The end of the port member 69 remote from the reaction piston bears against the underside of a check valve plate 71 which is biased to closed position by a spring 72 carried within the cage 73. The check valve cage 73 and plate 71 and the port member 69 may be assembled in the end cap 35 prior to application of the end cap to the pump housing. The port member 69 is sealed from leakage by O-ring 69a. The reaction piston 67 is biased toward the port member 69 by means of a spring 75. A spring flange 76 is secured to the outer end of the reaction piston 67 and serves as an abutment for one end of the spring 75. The other end of the spring 75, by means of ring 77, exerts a thrust against the end face of the cylinder block 50. The arrangement of springs 75 is such that their combined reaction biases the cylinder block 50 away from the end cap 35 and towards its maximum displacement position. The cylinder block 50, although slidable axially, is secured against rotation on the member 38a by means of a pin 79 carried by the cylinder block with the inner end of pin 79 riding in an axial groove 80.

Assuming the cylinder block is in the position shown in FIG. 1 and the driving shaft 10 is rotated, the piston 58 will be reciprocated and the piston 58 in the retracted position shown admits fluid from the interior of the housing into the cylinder port 57 and thence into the cylinder 52. As the piston 58 moves axially on its pumping stroke the inlet port 57 is closed by the piston and the fluid trapped between the piston and the check valve 71 is discharged through the check valve 71 to the pump outlet 7.

It will be understood that by moving the cylinder block 50 axially on its support 38a within the housing, the effective closing position of the port 57 is changed. As the cylinder block 50 is moved to the left in FIG. 1, the displacement will be progressively reduced. Conversely, when the cylinder block 50 is moved to the right (the position illustrated in FIG. 1), a condition of maximum displacement is approached.

The extreme inner end portion 38b of the guide member 38 is provided with an annular member 83 which forms an abutment or reaction member of a fluid piston and cylinder arrangement which is utilized for moving the cylinder block 50 axially. An annular reaction chamber 84 is formed between the inner diameter of the cylinder block 50 and the outermost diameter of the portion 38b. An annular passageway 85 leads into the chamber 84 and said passageway 85 opens to a port 86 leading to the chamber 88 at the interior of the member 38a.

A plug 87 is secured at the inner bore of the member 38a so as to form a fluid chamber 88 within the member 38a and said chamber 88 is thus maintained in open communication with the reaction chamber 84 utilized for moving the cylinder block 50 to different displacement positions.

A cylinder block control valve, indicated in its entirety as at 90, is arranged co-axially of the end plate 37 and is effective to introduce fluid under outlet pressure to the chamber 84 so as to reduce the pump displacement or exhaust fluid from the chamber 84 and increase the pump displacement. The control valve 90 is mounted for reciprocation in a bore 91 which is centrally formed in the guide member 38. The control valve 90 is biased to the left as viewed in FIGS. 1, 4 and 5 by means of a spring 92 within the chamber 88. One end of the spring 92 bears against the plug 87 and the other end of the spring 92 bears against washer 93 which is recessed to receive a portion of a ball 94. The valve 90 includes a plunger body 95 having axially spaced, reduced diameter annular portions at 96 and 97. The end of the plunger body 95 is equipped with a cap 98 which is provided with an internal counterbore 99 terminating in a shoulder adjacent a snap-ring 100 carried by the plunger 95.

The plunger body 95 of the control valve 90 is provided with adjusting means including an elongated stem 105 slidable within the bore of the plunger body 95 and an adjusting screw 106 threaded into the body in alignment with the outlet port 7. The effective length of the plunger body may be varied by turning the adjusting screw 106 so as to advance the stem 105 to the right as view in FIGS. 4 and 5. The end of the stem 105 remote from adjusting screw 106 bears against the inside of the cap 98 and turning the screw 106 inwardly will move the cap 98 axially of the plunger body 95 as permitted by the sliding fit of the cap 98 on the body 95. The end cap 98 is recessed to receive the ball 94 and is apertured to vent the space between the end cap and the end of the plunger body 95.

Figure 4:
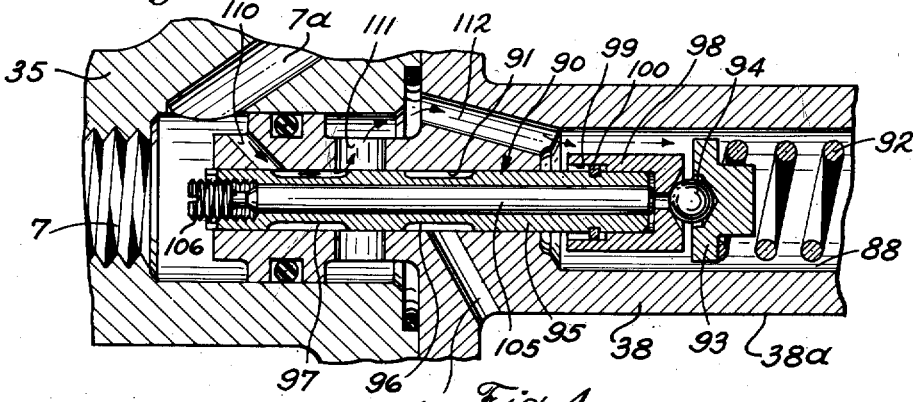
FIG. 4 is an enlarged sectional showing of the pressure responsive means effective to move the cylinder block to a reduced displacement position.

The passageway 7a directs the output from each of the cylinders to the pump outlet 7 and the pressure on the fluid at the outlet is effective over the cross-sectional area of the plunger 95 which is exposed to the outlet pressure. Assuming that the pump is designed to deliver fluid at a pressure of about 2000 pounds, an increase in the output pressure to 2020 pounds will be effective to move the plunger body 95 to the right against the bias imposed by the spring 92. In FIG. 4 of the drawings the plunger body 95 is shown as moved to a position resulting from an increase in output pressure so that fluid at the outlet is directed into the control valve by means of the bore 110, thence along the annular chamber formed by portion 97, thence radially outward through port 111 in the control valve body to passageway 112 leading to the chamber 88.

The fluid in chamber 88 acting on the cross-sectional area of the plunger 95 together with the spring 92 moves the plunger to the left, thus closing the space 88 from high pressure fluid. The increased pressure inside the space 88 is admitted through port 86 to the reaction chamber 84 where such fluid pressure is effective to move the cylinder block 50 to the left as illustrated in FIG. 6 of the drawings. As described above the movement of the cylinder block to the left reduces the displacement of the pumping pistons by reason of the change in the position of the port 57 with respect to the position of the pistons 58. The pump will continue to operate at such reduced volume and yet maintain a working pressure of approximately 2000 pounds. When the pressure at the outlet drops off to something less than 2000 pounds per square inch, the spring 92 is effective to move the plunger body 95 to a position illustrated in FIG. 5. With the plunger 95 in the position shown in FIG. 5 the fluid in chamber 88 is discharged in the direction of the arrows outwardly through the passageway 112, thence through the port 111 and into the annular chamber around portion 96 of the plunger 95 and thence outwardly through passageway 114 to the interior of the pump housing. When the reaction chamber 84 is thus relieved of fluid pressure, the springs 75 are effective to move the cylinder block 50 toward its maximum displacement position as illustrated in FIG. 1. Such maximum displacement position will be maintained until a load is imposed on the outlet line exceeding the adjusted pressure of the control valve 90. In the example given of 2000 pounds per square inch, an increase of outlet pressure will result in movement of the cylinder block to a position of lesser displacement.

Figure 5:
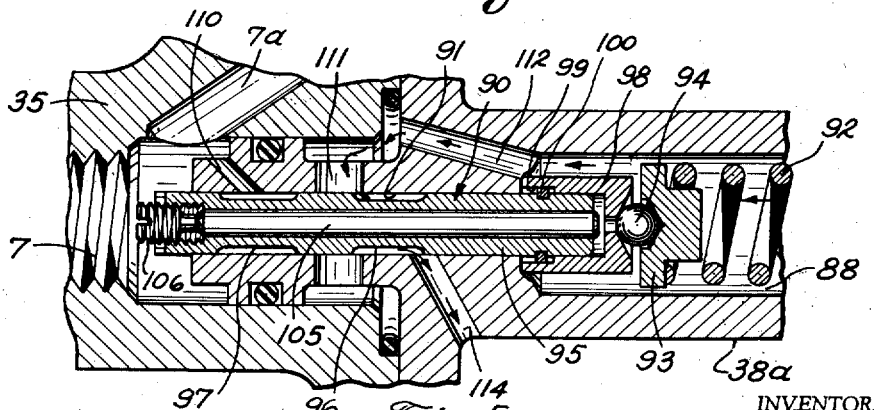
FIG. 5 is a sectional view similar to FIG. 4 showing the pressure responsive means moved to another position for effecting maximum displacement position of the cylinder block.
Figure 6:
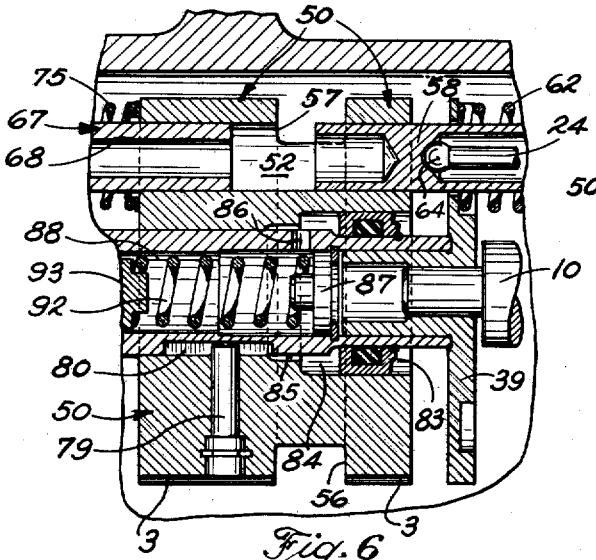
FIG. 6 is a sectional view showing the cylinder block as moved to a reduced displacement position.

The arrangement disclosed is sensitive to small variations in outlet pressure and, although two distinct positions of the control plunger 95 are shown in FIGS. 4 and 5, it will be understood that the plunger will be moved to and from numerous intermediate positions during different load conditions during the operation of the pump. The arrangement is automatic in that low pressures position the cylinder block for maximum displacement and such displacement will vary within limits as changes in the outlet pressure occur. The control valve 90 may be adjusted so as to operate within a relatively narrow range such, for example, as the range between 2000 pounds and 2020 pounds. As the 2000 pounds per square inch pressure is approached, the control valve 90 starts to move in a direction which will reduce the displacement of the pumping cylinders.

Figure 3:
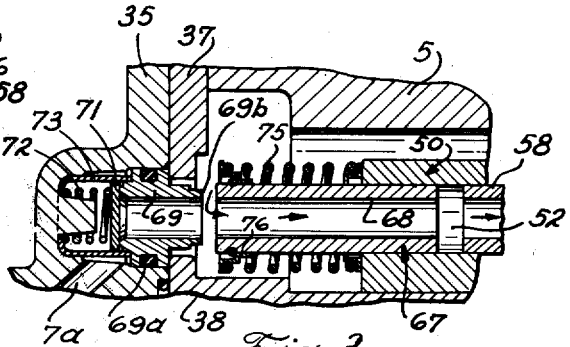
FIG. 3 is a sectional view showing a reaction piston moved away from an outlet port to admit fluid into the pumping cylinder.

In the form of the invention illustrated in FIGS. 1 to 3, the reaction piston 67 is guided in the bore of the cylinder 52 at one end and the other end of the reaction piston bears against the reduced end face 69b of the port member 69. During the pressure stroke, that is, when the pumping piston 58 is moving toward the check valve 71, the fluid pressure in the cylinder is effective against the end walls of the reaction piston 67 tending to hold the reaction piston against the reduced end face 69a of the port member 69. The end of the reaction piston 68 within the cylinder bore of the cylinder 52 is subjected to the discharge pressure on the cross-sectional area of its wall. The pressure thus applied to the reaction piston is effective over the reduced contact area presented at 69b to seal in this area.

The springs 75 interposed between the end of the cylinder block and the end of the reaction piston are pre-loaded and it will be observed that such pre-loading changes with the movement of the cylinder block as such block is moved to vary the effective displacement volume. The effect of the pre-loading of the spring 75 will be at least at the maximum output position of the pump and will gradually increase in effect as the cylinder block 50 moves to its minimum displacement position. Accordingly it will be understood that a high pressure-minimum displacement condition a higher unit pressure is obtained between the end of the reaction piston and the face 69b of the port member due to the change in the pre-load of the spring 75. The performance of the pump is basically affected by variations in the pre-load selected for the springs 75.

Assuming that the pre-loading of the spring 75 is greater than the effect of the fluid pressure on the end wall of the reaction piston within the cylinder, such pre-loading of the spring 75 will insure that under the action of vacuum developed during the suction stroke the reaction piston will remain sealed against the port member 69. Accordingly the springs 75 perform a dual function, one of which is to maintain the reaction piston against the port member and the other of which is to apply a force biasing the cylinder block 50 to its maximum displacement position. The last force referred to is, of course, the total force of all of the springs 75 tending to bias the cylinder block 50 to the right.

When the reaction piston spring 75 is selected so as to provide a lesser pre-loading, a different pump performance is obtained. For example, the pre-loading on the springs 75 may be selected so that when the pumping piston 58 starts back on its suction stroke with the cylinder block in its extreme position to the right, the reaction piston will move to the right away from the port member 69 as illustrated in FIG. 3. The actual distance that the reaction piston 67 moves away from the port member 69 will depend not only on the pre-load of the spring 75 but also on the spring rate and the position of the cylinder block. Such opening of the cylinder 52 to fluid by movement of the member 67 away from the port member 69 is designed preferably to occur when the cylinder block 50 is in its maximum displacement position.

For purposes of illustration, the space between the end of the reaction piston 67 and port member 69 is exaggerated in the showing of FIG. 3. Under the conditions above described fluid within the pump housing is introduced to the cylinder 52 by way of the open end of the reaction piston 67. As soon as the reaction piston 67 leaves the surface of the port member 69 oil flows into the cylinder as induced by the vacuum created in the cylinder 52 by the pumping piston 58. Thus during maximum displacement conditions the reaction piston 67 functions as an additional port for filling the pumping cylinder. This advantageous result is important at high speed operating conditions and permits utilization of the full pumping stroke. The overall result is that the potential output of the pump is increased without increasing the physical dimensions of the pump.

Figure 7:
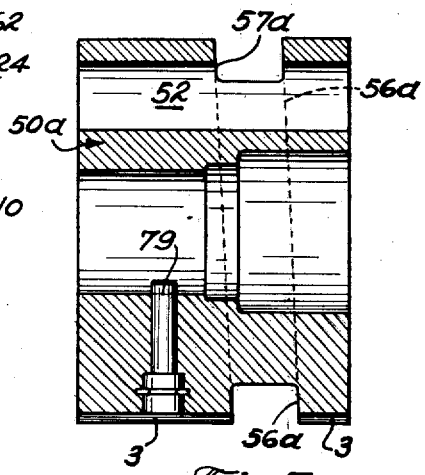
FIG. 7 is a sectional showing of a modified form of cylinder block wherein the inlet port for each cylinder is at a different location axially of the cylinder block.

It will be observed from the foregoing description of the preferred embodiment that each of the pumping pistons is uniformly effective with respect to volume displacement. The loading groove 56 in the cylinder block 50 is an annular groove around the cylinder block at right angles to the axis of the cylinder block so that each cylinder port 57 is located at the same point axially with respect to the uniform stroke travel of the pistons 58. Where the pump according to my invention is to be used largely for small volume output, it is preferable to form the entrance or loading groove at an angle with respect to the axis of the cylinder block. In FIG. 7 a piston block 50a is shown having an entrance groove 56a which is tilted with respect to the central axis of the piston block. The result of the inclination of the loading groove 56a is that the entrance ports 57a are each disposed at a different point axially along the length of the cylinder block.

It will be understood that with the entrance or loading port groove *56a* inclined with respect to the central axis of the cylinder block, the number of pistons effective in pumping becomes progressively smaller as the volume output of the pump diminishes. Whereas with the loading groove 56 in the form of the pump of FIG. 1 results in each piston having the same effective stroke, the form of cylinder block shown in FIG. 7 results in each piston having a different effective stroke. With the first form described each of the pistons is characterized by a short effective stroke during a small volume output which results in high bearing loads and high pressures in each piston, whereas with the inclined loading slot the number of pistons subjected to pressure is progressively diminishing as the volume is reduced. With the inclined loading slot of FIG. 7 an arrangement is provided whereby under minimum output conditions only one piston may be working effectively.

It is also a characteristic of the inclined loading slot design that a much larger amount of the cylinder block axial movement is required to accomplish a given change in volume. This produces a beneficial effect on the control valve making it more stable in the small volume output range. There is also an advantage in the inclined loading slot in that the end of the piston presented to the inlet port 57a of the cylinder provides a wedge-shaped port effective to reduce the entrance shock and noise.

Figure 8:
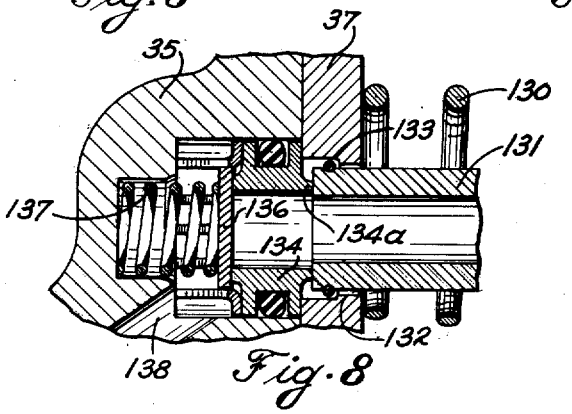
FIG. 8 is a sectional view of a modification of the pump structure wherein the reaction piston is mounted in an end plate carried by the pump housing and a single spring is utilized to bias the cylinder block toward a maximum displacement position.

In the preferred form of pump illustrated in FIG. 1, the reaction pistons are each provided with a spring 75 biasing the reaction piston toward the check valve port member 69. In the design of FIG. 1 the combined effect of the springs 75 is utilized to bias the cylinder block to its maximum displacement position. In FIG. 8 a form of pump is illustrated wherein a single large diameter coil spring 130 is disposed between the member 37 and the cylinder block 50. In this form of pump the reaction piston 131 extends through an opening 132 in the plate 37 and is secured therein against axial displacement by a snapring 133. The reaction piston 131 is not biased axially by the spring 130. The wall thickness of the reaction 131 is proportioned as in the preferred embodiment with respect to port member 134 so that the relative end areas provide a seal during the pumping stroke of the piston. The pumping pressure in the cylinder acts against the inner end of reaction piston 131. A check valve 136 is biased by spring 137 against the end of the port member 134. The port member 134 is reduced in area as at 134a so that the unit pressure exceeds the fluid pressure on the pumping stroke. During the pumping stroke the check valve is opened and discharges through the outlet passageway 138 leading to the outlet 7 of the pump housing.

Figure 9:
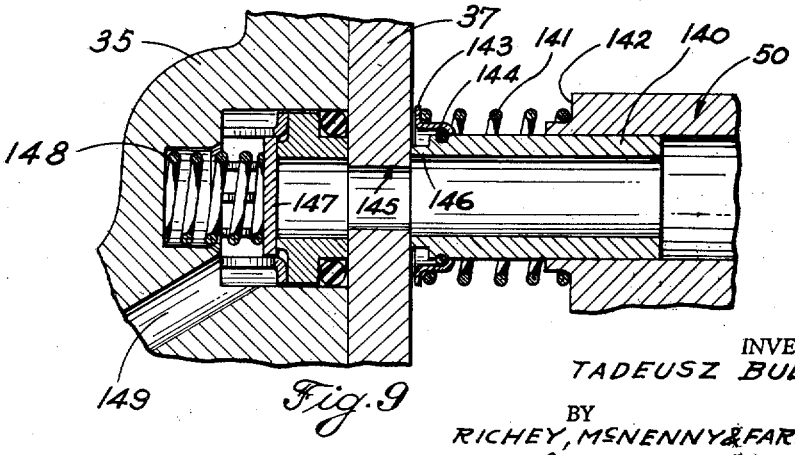
FIG. 9 is a further modification of the pump structure wherein the reaction piston is biased toward an opening in a plate carried by the pump housing.

A further modification of the connection between the end of the reaction piston and the check valve is illustrated in FIG. 9 wherein the reaction piston 140 carried within the cylinder block 50 is provided with a spring 141 interposed between the shoulder 142 on the cylinder block and the flange 143 carried at the outer end of the reaction piston by snap-ring 144. In this form of pump the reaction piston end 146 bears against the plate 37 which is apertured as at 145 in alignment with the bore of the reaction piston 140. In this modification, as in the preferred form, the cylinder block 50 is biased away from the plate 37 by the springs 141. The extreme outer end of the reaction piston 140 is provided with a reduced portion 146 so that the pumping pressure at the interior of the cylinder will be effective against the inner end walls of the reaction piston to provide a seal between the portion 146 and the wall 37. With the form of reaction piston mounting shown in FIG. 9, the springs 141 may be preloaded as described in connection with the first embodiment so that under maximum displacement conditions the reaction piston may move away from the wall 37 and permit fluid to flow into the cylinder through the reaction piston 140 during a part of the suction stroke. In operation the check valve 147 is opened on the pumping stroke against the bias of the spring 148 so that fluid pumped by the piston is discharged toward the outlet of the housing through the passageway 149.

Figure 10:
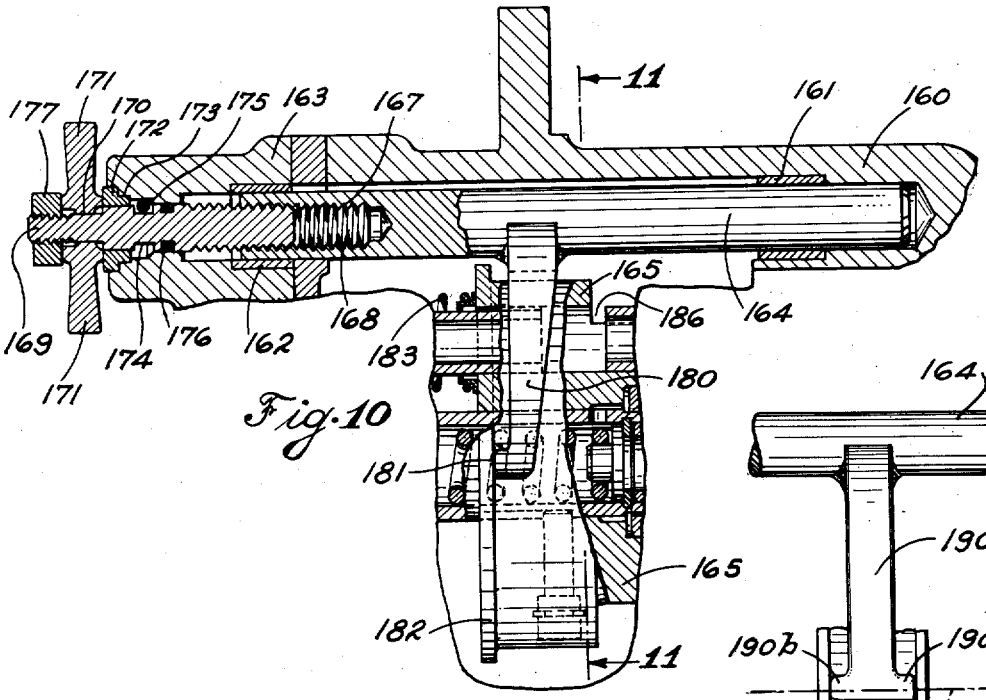
FIG. 10 is an elevation of a manual limit control to adjust the maximum volume output.
Figure 11:
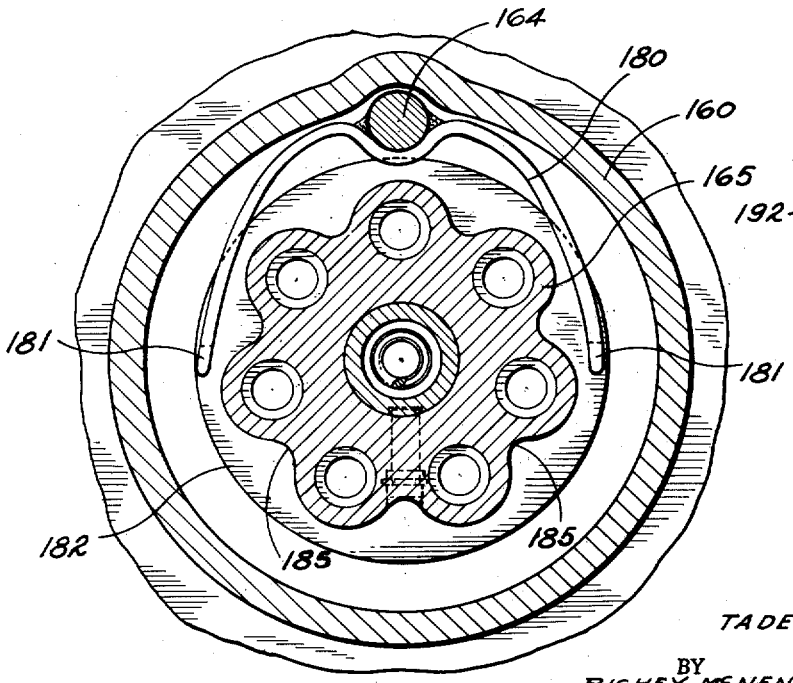
FIG. 11 is a transverse sectional view taken on the plane indicated at 11—11 of FIG. 10.

In the various forms of pump thus far described the pressure responsive control valve is arranged to move the cylinder block assembly from its position of maximum displacement to a position of minimum displacement. In certain installations it will be desirable to establish a fixed maximum displacement limit. For example, the pump may be arranged to drive a machine tool wherein the driven machine will not operate efficiently where the volume of oil employed exceeds a fixed amount per minute such, for example, as 20 gallons per minute. The pump, on the other hand, may be constructed to deliver a maximum rate of 27 gallons per minute. To provide means for adjustably fixing the maximum volume output the apparatus illustrated in FIGS. 10 and 11 is employed.

The pump housing 160 is provided with a pair of axially spaced bushings 161 and 162. The bushing 162 may be carried in the end cap 163 of the housing and said bushings are arranged to support a shaft 164 for limited axial sliding movement parallel to the cylinder block 165. The end of the shaft 164 adjacent the end cap housing is provided with an interior bore threaded as at 167 to receive a threaded member 168 which is journalled for rotational movement in the end cap 163. The outer end portion 169 of the member 168 is provided with a square section as at 170 to receive a handle 171 having a square opening. A thrust member 172 is mounted in the end cap on a stepped shoulder 173. The threaded member 168 is provided with an annular groove 174 and a transverse retaining pin 175 in the housing extends into the bore to prevent axial displacement of the threaded member 168. A spaced annular groove 176 receives an O-ring seal. A nut 177 is arranged to be drawn up to secured the handle on the stem 169. Rotation of the threaded member 168 moves the shaft 164 axially within the limits of the threaded connection and the mounting of the shaft in the housing.

A shifting fork 180 is secured to the shaft 164 and the depending arms of the fork 180 embrace the cylinder block 165 in the horizontal plane extending through the central axis of the cylinder block 165. The extreme outer ends of the fork 180, as at 181, bear against an annular flange 182 formed on the cylinder block 165. The reaction springs 183 normally bias the cylinder block to its maximum displacement position as in the preferred embodiment. In the form here described, however, the maximum displacement position is determined by the axial position of the shaft 164 and this may be adjusted externally of the pump to suit the requirements of the device to be driven. The cylinder block 165 may be moved from the position shown in FIG. 10 to positions of lesser displacement by the pressure responsive control valve heretofore described.

Figure 12:
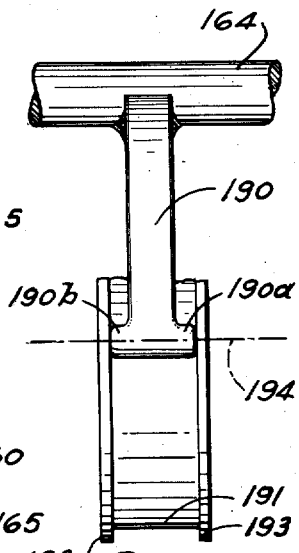
FIG. 12 is an elevation of a modified manual control for the pump.

The manually operable shifting fork 180 is suited for use with the pump of my invention even though the pressure responsive means for moving the cylinder block is not utilized and the springs biasing the cylinder block to maximum displacement are omitted. FIG. 12 illustrates such an embodiment. The shifting rod 164 is provided with a fork 190 adapted to embrace the cylinder block 191. The fork 190 is fitted in between ribs 192 and 193 formed on the outer periphery of the cylinder block 191. The rounded fork portions 190a and 190b bear against the ribs along the plane of the central axis of the cylinder block as at 194. Manual adjustment of the fork 190 to the left, as viewed in FIG. 12, reduces the displacement as described in connection with FIGS. 1 to 11. The displacement is increased by adjusting the fork to the right as viewed in FIG. 12.

In the form of cylinder block illustrated in FIGS. 10 and 11, the grooves extending axially between the cylinders are indicated at 185 and it will be understood that such grooves facilitate the loading of fluid into the cylinder ports 186 substantially as the axial grooves in the preferred embodiment.

Although I have shown and described a preferred form of my invention and certain modifications of components of the preferred form, it will be understood by those skilled in the art that other variations may be made without departing from the scope of the invention as defined in the following claims.

What is claimed is:

1. A piston pump comprising a pump housing providing a liquid chamber, inlet and outlet ports for said chamber, a guide extending from said housing into said chamber, a cylinder block slidably mounted on said guide, a cylinder bore in said cylinder block, a plunger extending into one end of said cylinder bore, means on said housing to reciprocate said plunger member in said cylinder bore, an inlet port for said cylinder bore, a reaction piston extending into the other end of said cylinder bore, said reaction piston being axially slidable relative to said housing and said cylinder block, a discharge port in said reaction piston, a discharge check valve for said discharge port, said check valve having an annular member with a planar sealing face adjacent said discharge port, said reaction piston having a mating planar sealing surface engaging said sealing face on said annular member, and control means to adjust the axial position of said cylinder block member relative to said guide for determining the effective discharge stroke of said plunger member.

2. A piston pump comprising a pump housing providing a liquid chamber, an end plate for the housing, a guide member projecting from said end plate into said housing, said guide member having a central axial extension protruding into said chamber, a cylinder block slidably mounted on said guide member extension, a cylinder bore in said cylinder block, a plunger extending into one end of said cylinder bore, rotating drive means to reciprocate said plunger, an inlet port for said cylinder bore, a reaction piston extending into the other end of said cylinder bore, a discharge port in said reaction piston, said end plate having an opening aligned with said discharge port, and a discharge check valve aligned with said opening and said reaction piston discharge port, said reaction piston having a planar sealing surface at the plate end thereof, a mating planar sealing surface around said plate opening for sealing engagement with the sealing surface of said reaction piston, means mounting said reaction piston in said cylinder block for limited movement transversely of the plate opening along said sealing surfaces, and control means for changing the axial position of said cylinder block relative to said guide member and end plate for determining the effective discharge stroke of said plunger.

3. A piston pump comprising a pump housing providing a liquid chamber, an end plate fixed in the housing, a guide member carried by said plate having a central axial extension protruding into said chamber, a cylinder block slidably mounted on said guide member extension, a cylinder bore in said cylinder block, a plunger extending into one end of said cylinder bore, means to reciprocate said plunger, an inlet port intermediate the ends of said cylinder, a reaction piston having one end slidable in the other end of said cylinder bore, said plate having an opening aligned with said reaction piston, a discharge check valve mounted in the pump housing in alignment with said plate opening, said reaction piston having a planar sealing surface at said plate opening, a check valve tube in said plate opening provided with a mating planar sealing surface for sealing engagement with the sealing surface of said reaction piston, means mounting said reaction piston in said cylinder block for limited movement with respect to said mating sealing surface on the check valve tube, and control means for adjusting the axial position of said cylinder block relative to said guide member and end plate for determining the effective discharge stroke of said plunger.

4. A piston pump having a hollow body and an end cap providing a liquid chamber, a guide member in said housing, said guide member having a radial mounting flange clamped between said body and end cap and a central axially extending cylindrical extension protruding into said chamber, a cylinder block slidably mounted on said extension, a cylinder bore in said cylinder block, a plunger extending into one end of said cylinder bore, means to reciprocate said plunger, an inlet port for said cylinder bore, a reaction piston extending into the other end of said cylinder bore, a discharge port in said reaction piston, and a discharge check valve in said end cap for said discharge port, said reaction piston having a sealing surface facing away from said plunger, a mating sealing surface on said radial flange for sealing engagement with the sealing surface of said reaction piston in a plane normal to the axis of said cylinder bore, means mounting said reaction piston in said housing so that its sealing surface can freely slide radially across said mating sealing surface, and control means for adjusting the axial position of said cylinder block relative to said guide member and pump housing for determining the effective discharge stroke of said plunger.

5. A piston pump comprising a pump housing providing a fluid chamber, an inlet port for said fluid chamber, an outlet port on said pump housing, a cylinder block mounted within said fluid chamber for sliding movement along a longitudinal axis, a plurality of cylinder bores in said cylinder block extending from end to end therethrough parallel to said longitudinal axis, a plunger member extending into one end of each of said cylinder bores, means to reciprocate said plunger members in their respective cylinder bores, an inlet port for each of said cylinder bores formed in said cylinder block intermediate the ends thereof, a tubular reaction piston extending into the end of said cylinder bore opposite said plunger member, said reaction piston being axially slidable relative to said pump housing and said cylinder block, a tubular discharge port member in said housing in axial alignment with each of said cylinder bores, the adjacent ends of said reaction piston and said discharge port member being formed with mating sealing faces to provide a face to face seal in a plane normal to said longitudinal axis, at least one of said sealing faces being planar, means to bias said reaction piston into sealing engagement with said discharge port member, and control means to shift the axial position of said cylinder block relative to said pump housing for adjusting the effective discharge stroke of said plunger members.

6. A piston pump as set forth in claim 5 wherein said means bias said reaction piston into sealing engagement with said discharge port member comprises a compression spring between each reaction piston and said cylinder block adapted to engage the reaction piston to press the reaction piston into sealing engagement with said discharge port member, said compression spring engaging said cylinder block to urge said cylinder block in the opposite direction away from said discharge port member.

7. A piston pump as set forth in claim 5 wherein the area of sealing engagement between the mating sealing faces on said reaction piston and said discharge port member is less than the effective cross-sectional area of said reaction piston within said cylinder bore.

8. A piston pump comprising a pump housing providing a fluid chamber, an inlet port for said fluid chamber, an outlet port on said pump housing, a cylinder block mounted within said fluid chamber for sliding movement along a longitudinal axis, a plurality of axial cylinder bores in said cylinder block extending from end to end therethrough parallel to said longitudinal axis, a plunger member extending into one end of each of said cylinder bores, means to reciprocate said plunger members in their respective cylinder bores, inlet ports for said cylinder bores formed in said cylinder block intermediate the ends thereof, a tubular reaction piston extending into the end of each cylinder bore opposite the plunger member, said reaction pistons being axially slidable relative to said housing and said cylinder block, a discharge port in said pump housing for each of said cylinder bores, passage and check valve means adapted to conduct fluid from said discharge ports to said outlet port, each of said discharge ports having an annular planar sealing face in sealing contact with the end of the adjacent one of said reaction pistons, the end of each reaction piston away from said plunger member being formed to make face-to-face planar sealing engagement with its discharge port sealing face in a plane normal to said longitudinal axis, the area of sealing contact between said sealing faces being less than the effective cross-sectional area of said reaction piston within said cylinder bore, said reaction pistons and said discharge ports being constructed and arranged to align themselves radially and transversely while maintaining sealing contact therebetween, a helical spring surrounding each reaction piston and arranged to bias the same into sealing contact with said discharge port, and control means to shift the axial position for said cylinder block relative to said housing for adjusting the effective discharge stroke of said plunger members.

9. A piston pump comprising a pump housing member providing a fluid chamber, an inlet port for said fluid chamber, an outlet port on said pump housing member, a cylinder block member mounted within said fluid chamber for sliding movement along a longitudinal axis, a plurality of axial cylinder bores in said cylinder block member extending parallel to said longitudinal axis, a plunger extending into one end of each of said cylinder bores, means to reciprocate said plungers in their respective cylinder bores, inlet ports opening into said cylinder bores intermediate the ends thereof, an adjacent discharge bore in said pump housing member for each of said cylinder bores, a tubular reaction piston to conduct fluid from each cylinder bore to the adjacent discharge bore, said reaction piston being slidably mounted on one of said members for axial movement parallel to said cylinder bores in axially sliding sealing relation with said one member, said reaction pistons being contrained against radial and transverse movement by said one member, passage and check valve means adapted to conduct fluid from said discharge bores to said outlet port, a sealing face on the other of said members substantially aligned with the adjacent reaction pistons, the end of each reaction piston adjacent said other member having a sealing face adapted to engage said adjacent sealing face on said other member, said sealing faces being constructed and arranged to form a planar seal to allow relative movement radially and transversely therebetween while maintaining sealing engagement, spring means constructed and arranged with said tubular reaction piston to bias said reaction piston into sealing contact with said other member, said reaction piston having a cross-sectional area exposed to fluid pressure which in combination with said spring means operates to bias the reaction piston into sealing engagement with said other member, and control means to shift the axial position of said cylinder block member relative to said housing member for adjusting the effective discharge stroke of said plungers.

*10. A pump comprising a housing having an inlet and an outlet, an axial guide member mounted in said housing, a cylinder block mounted for movement along said guide member, said cylinder block having a plurality of piston bores therein arranged symmetrically equidistantly about the axis of said guide member, a piston mounted for reciprocation in each of said bores, means to reciprocate said pistons, a reaction piston in each of said cylinders, a check valve mounted in the housing in alignment with each of said reaction pistons and passageways to conduct hydraulic fluid under pressure from said check valves to said outlet, control means for moving said cylinder block to vary the output displacement, said control means comprising spring means biasing the cylinder block along said guide to its maximum displacement position, hydraulic cylinder and piston means coaxial with said guide member operatively connected to said cylinder block and said guide, said hydraulic cylinder and piston means having a substantially smaller cross-sectional area than said cylinder block, a control plunger movable to one position effective to introduce fluid pressure from said outlet to said hydraulic cylinder and movable to another position to discharge fluid from said hydraulic cylinder into said pump housing, one end of said plunger being open to hydraulic pressure at said outlet, the other end of said plunger having spring means biasing the plunger in opposition to said outlet pressure, said other end of said plunger being also subjected to the hydraulic pressure effective in said cylinder whereby said cylinder block may be moved toward its position of minimum displacement by hydraulic fluid pressures which are substantially less than the hydraulic pressures effective at said outlet.*

*11. A pump comprising a housing having an inlet and an outlet, an axial guide member mounted in said housing, a cylinder block mounted for movement along said guide member, said cylinder block having a plurality of piston bores therein arranged symmetrically equidistantly about the axis of said guide member, a piston mounted for reciprocation in each of said bores, means to reciprocate said pistons, a reaction piston in each of said cylinders, a check valve mounted in the housing in alignment with each of said reaction pistons and passageways to conduct hydraulic fluid under pressure from said check valves to said outlet, control means for moving said cylinder block to vary the output displacement, said control means including spring means biasing the cylinder block along said guide to its maximum displacement position, hydraulic cylinder and piston means coaxial with said guide member operatively interposed between said cylinder block and said guide, said hydraulic cylinder and piston means having a substantially smaller cross-sectional area than said cylinder block, said guide having a bore therein, a control plunger movable in said bore to one position effective to introduce fluid pressure from said outlet to said hydraulic cylinder and movable to another position to discharge fluid from said hydraulic cylinder into said pump housing, one end of said plunger being open to hydraulic pressure at said outlet, spring means within the bore biasing the plunger in opposition to said outlet pressure, said other end of said plunger being also subjected to the hydraulic pressure effective in said cylinder whereby said cylinder block may be moved toward its position of minimum displacement by hydraulic fluid pressures which are substantially less than the hydraulic pressures effective at said outlet.*

*12. A variable displacement pump comprising a housing having an inlet and an outlet, a cylinder block mounted for axial sliding movement in said housing, said cylinder block having a plurality of cylinder bores extending from end to end therethrough arranged symmetrically equidistantly about a central axis, piston means reciprocable in said cylinder bores, drive means in said housing for reciprocating said piston means, means connecting each of said cylinder bores to said outlet, means biasing said cylinder block in said housing to a position with respect to said piston means for maximum displacement of fluid by said piston means, fluid motor means comprising a piston element and a cylinder element positioned within said housing coaxial with said central axis of said cylinder block, one of said elements being connected to said cylinder block and the other of said elements being connected to said housing whereby fluid pressure in said fluid motor means is operable to shift said cylinder block toward a minimum displacement position in opposition to said biasing means, and valve means controlling communication between said outlet and said fluid motor and operable in response to pressure changes at said outlet to control the fluid pressure in said fluid motor to vary the output displacement of the pump in response to changes in the pump outlet pressure.*

*13. A variable displacement pump comprising a housing having an inlet and an outlet, a cylinder block mounted for axial sliding movement in said housing, said cylinder block having a plurality of axially extending cylinder bores extending from end to end therethrough arranged symmetrically equidistantly about a central axis, piston means reciprocable in said cylinder bores, drive means in said housing for reciprocating said piston means, means connecting each of said cylinder bores to said pump outlet, spring means biasing said cylinder block in said housing to a position with respect to said piston means for maximum displacement of fluid by said piston means, a fluid motor including a cylinder element and a piston element positioned in said housing coaxial with said central axis of said cylinder block, one of said elements being connected to said cylinder block and the other of said elements being connected to said housing, whereby fluid pressure in said fluid motor operates to shift said cylinder block toward a minimum displacement position in opposition to said spring biasing means, and valve means controlling fluid communication between said outlet and said fluid motor, said valve means including a bore communicating at one end with said outlet and at the other end with said fluid motor, a valving member axially slidable in said bore, port means on said valving member and said bore adapted to selectively connect said fluid motor to said outlet and to the interior of said housing, said valving member being biased in one direction by the pressure in said outlet, said valving member being biased in the opposite direction by spring means and by fluid pressure within said fluid motor.*

References Cited in the file of this patent or the original patent

UNITED STATES PATENTS

| | | |
|---|---|---|
| 2,033,464 | Ferris | Mar. 10, 1936 |
| 2,064,299 | Ferris et al. | Dec. 15, 1936 |
| 2,483,705 | Levetus et al. | Oct. 4, 1949 |

(Other references on following page)

UNITED STATES PATENTS

| | | |
|---|---|---|
| 2,649,741 | Henrichsen | Aug. 25, 1963 |
| 2,845,941 | Wagner | Aug. 5, 1958 |
| 2,901,975 | Grad | Sept. 1, 1959 |
| 2,990,781 | Tuck et al. | July 4, 1961 |
| 2,992,619 | Nilges | July 18, 1961 |

FOREIGN PATENTS

| | | |
|---|---|---|
| 104,333 | Sweden | Dec. 20, 1940 |
| 402,603 | Great Britain | Dec. 7, 1933 |
| 411,189 | Italy | July 18, 1945 |
| 411,190 | Italy | July 18, 1945 |
| 1,202,109 | France | July 20, 1959 |